United States Patent [19]

Symons

[11] Patent Number: 5,174,818

[45] Date of Patent: Dec. 29, 1992

[54] COMPOSITION AND METHOD FOR FORMING A TILE BODY

[75] Inventor: Michael W. Symons, Pretoria, South Africa

[73] Assignee: Plascon Technologies Limited, Bedfordview, South Africa

[21] Appl. No.: 669,432

[22] Filed: Mar. 15, 1991

[30] Foreign Application Priority Data

Mar. 15, 1990 [ZA] South Africa ............... 90/1986

[51] Int. Cl.⁵ ............... C04B 9/02; C04B 11/00
[52] U.S. Cl. ............... 106/686; 106/687; 106/724; 106/729; 106/778; 106/780
[58] Field of Search ............... 106/683, 685, 686, 687, 106/688, 772, 775, 776, 781, 785, 786, 774, 651, 658, 670, 724, 732, 735

[56] References Cited

U.S. PATENT DOCUMENTS

| | | | |
|---|---|---|---|
| 2,702,753 | 2/1955 | Dickey | 106/686 |
| 2,939,799 | 6/1960 | Chisholm | 106/687 |
| 3,719,512 | 3/1973 | Danielis | 106/688 |
| 4,729,853 | 3/1988 | von Bonin | 106/781 |
| 4,931,099 | 6/1990 | Dobbers et al. | 106/776 |

OTHER PUBLICATIONS

V. S. Ramachandran *Concrete Admixtures Handbook Properties Science & Technology* (1984) pp. 337-345 and p. 419.

N. Irving Sax & Richard J. Lewis, Sr., Hawley's Condensed Chemical Dictionary, 11th Ed., p. 239.

*Primary Examiner*—Karl Group
*Assistant Examiner*—Paul Marcantoni

[57] ABSTRACT

A composition for forming a tile body consists of a major amount by weight of calcium sulphate hemi-hydrate, 11 to 13% by weight of the calcium sulphate hemi-hydrate of a phenolic resin, a suitable amount of a catalyst for the phenolic resin, water in an amount sufficient to provide with the water present in the other components of the composition approximately the amount of water theoretically required for complete rehydration of the calcium sulphate hemi-hydrate, about 1% by weight of the calcium sulphate hemi-hydrate of a melamine formaldehyde concentrate and about 1% by weight of the calcium sulphate hemi-hydrate of a polyvinyl alcohol. The composition may be used to form tile bodies which may take the place of conventional ceramic tiles utilized in bathrooms, kitchens and the like.

15 Claims, No Drawings

COMPOSITION AND METHOD FOR FORMING A TILE BODY

BACKGROUND OF THE INVENTION

This invention relates to a composition and a method for forming a tile body.

Conventional ceramic tiles are manufactured from ceramic materials, generally by the production of a tile body or biscuit which is fired in excess of 700° C., followed by the application of a decorative glaze to the tile body or biscuit, which is then fired in excess of 1000° C. The preparation of the tile body or biscuit and the subsequent glazing can be either separate operations, or carried out in a single firing operation. This manufacturing method is characterised by high energy consumption, the difficulty of achieving fine printing as a result of the glaze moving at very high temperatures, quite considerable wastage and breakage during the manufacturing method as a result of the release of stresses and tensions on cooling of the tiles, and high capital equipment requirements. Despite the fact that such tiles are capable of lasting for many years, fashion dictates that tiles such as bathroom and kitchen wall and floor tiles should be changed at regular intervals which interval may be as little as four to eight years. There is thus a need for a method of making a tile which may be used as a wall or a floor tile, which method is economic yet leads to a product with suitable properties of wear resistance and appearance.

U.S. Pat. No. 4,729,853 to Bayer AG discloses a flame retarding sealing composition and articles made therefrom such as panels, which consists of 10 to 50% by weight of a hydraulic binder selected from gypsum (calcium sulphate) and plaster of paris, 20 to 60% by weight of a dehydratable filler selected from the group consisting of aluminium hydroxides, aluminium hydrated oxides and hydrated alumina, 10 to 60% by weight of a melamine which may be melamine formaldehyde, 3 to 30% by weight of a polymer dispersion and optionally a pigment or an inorganic phosphorous-containing compound. The dehydratable filler must be one which "consumes" heat by a decomposition reaction or by evaporation, so that it assists in the flame retardation. The melamine component serves several useful functions in relation to flame retardation including the emission of gases which bond hydrogen halides as ammonium salts, which is a significant factor in the field of electrical installations, and in that it consumes energy during this decomposition process causing a heat discharge mechanism independent of the dehydration of the sealing compound and its fillers. The polymer dispersion is added to impart elasticity to the sealing composition and for dust prevention purposes. The essential components of the sealing composition are the hydraulic binder, the dehydratable filler and the melamine formaldehyde. There is no disclosure in this patent that the sealing composition may be used to form a tile body.

SUMMARY OF THE INVENTION

According to a first aspect of the invention there is provided a composition for forming a tile body which comprises:

(a) a major amount by weight of an inorganic base material selected from a calcium sulphate hemi-hydrate, magnesium oxychloride, magnesium oxysulphate and a hydraulic cement;

(b) 10 to 20% by weight of the inorganic base material of a thermosetting resin which is miscible, soluble or dispersable in water;

(c) a suitable amount of a catalyst for the thermosetting resin;

(d) water in an amount sufficient to rehydrate the inorganic base material with the water present in the other components of the composition;

(e) a suitable amount of a melamine formaldehyde condensate; and (f) a suitable amount of a polyvinyl alcohol.

The composition may also contain:

(g) a suitable amount of sodium carboxymethylcellulose.

A preferred composition of the invention comprises:

(a) a major amount by weight of calcium sulphate hemi-hydrate;

(b) 10 to 20%, more preferably 11 to 13% by weight of the inorganic base material of a thermosetting resin, preferably a phenolic resin;

(c) a suitable amount of a catalyst for the thermosetting resin;

(d) water in an amount sufficient with the water present in the other components of the composition approximately the amount of water theoretically required for complete rehydration of the calcium sulphate hemi-hydrate;

(e) 0.5 to 2.5% by weight, preferably about 1% by weight of the inorganic base material of a melamine formaldehyde condensate; and (f) 0.5 to 2.5% by weight, preferably about 1% by weight of the inorganic base material of a polyvinyl alcohol.

(g) 0.05 to 0.25% by weight of the inorganic base material of sodium carboxymethylcellulose.

According to a second aspect of the invention there is provided a method of making a tile body from a composition as set out above, which includes the steps of:

(1) mixing together components (a), (b), (d), (e) and (f);

(2) adding component (c) to the mixture of step (1);

(3) forming the composition of step (2) into a tile body; and (4) allowing rehydration of the inorganic base material to occur and curing of the thermosetting resin to occur.

After step (4) of the method of the invention, the tile body may be decorated by printing, glazing and/or coating or in any other suitable manner.

Preferably, in step (3) of the method of the invention, the composition is formed into a tile body by moulding or extrusion.

According to a third aspect of the invention there is provided a tile body formed from a composition or by a method as described above.

DESCRIPTION OF EMBODIMENTS

The first aspect of the invention is a composition for forming a tile body or biscuit.

The first component of the composition is a major amount, i.e. 50% or more by weight of an inorganic base material selected from a calcium sulphate hemi-hydrate, magnesium oxychloride, magnesium oxysulphate and a hydraulic cement.

The preferred inorganic base material is calcium sulphate hemi-hydrate. The calcium sulphate may be either alpha hemi-hydrate or beta hemi-hydrate or a mixture of the two. The alpha hemi-hydrate and the beta hemi-hydrate have different water demands and yield different crystalline structures on rehydration. The amount of water for complete rehydration of calcium sulphate hemi-hydrate is 18.5 grams of water per 100 grams of hemi-hydrate. On rehydration, the calcium sulphate increases volume slightly and the oversaturated solution of calcium sulphate, on exposure to water, first flocculates and then crystallises to form a rigid solid material. Rehydration goes to completion over a period of about 2 hours. The maximum temperature rise as a result of exothermic reaction is up to 45° C.

As an alternative to calcium sulphate hemi-hydrate, there may be used as the inorganic base material a magnesium oxychloride, a magnesium oxysulphate or a hydraulic cement such as cement fondue lafarge which contains approximately 40% aluminium oxide and is composed mainly of calcium aluminates, with complex calcium alumino ferrites and alumina silicates.

The second component of the composition of the invention is a thermosetting resin which is miscible, soluble or dispersable in water. The thermosetting resin is added to the inorganic base material to enable a slurry to be created without the addition of water beyond the theoretical amount of water required for complete rehydration of the inorganic base material.

Suitable thermosetting resins include phenolic resins, polyester resins and epoxy resins. As stated, these resins must be miscible, soluble or dispersable in water and must be unaffected in their polymerisation or cross-linking by the presence of water.

The preferred thermosetting resin is a phenolic resin. Generally, these phenolic resins are acid catalysed for setting and consist of mixtures of mono-, di- and tri-methylated phenolic structures in mono-, di- and tri-meric form, which are cross-linked to form three dimensional networks. Examples of suitable phenolic resins include the phenol formaldehydes or resols of low viscosity and particularly those of medium to low reactivity sold by British Industrial Plastics under the codes 17-1390 and the Norsophen resins 1200 to 1204 and 1703 and catalysed with a catalyst of British Industrial Plastics referred to as D-1650 in the ratio of 6 to 12 parts of catalyst per 100 parts of resin. Other suitable phenolic resins include Polylam 2432 from Polyresin Products a division of National Chemical Products Limited, Cellobond J2027L, J2018L, J2020/96L or J20/1081L from British Petroleum Company plc, catalysed with a catalyst of British Petroleum Company plc known as Phencat 10 or Phencat 15, or, PRP VCM90 or VX21. Typical properties of these resins are a specific gravity at 25° C. of 1.24 to 1.25, pH 7.3 to 7.8, and free formaldehyde level of 2.5% maximum. Another example of a suitable phenolic resin is a phenol resorcinol.

A suitable polyester resin is Polylite 321/83X of Polyresin Products, a division of National Chemical Products Limited. A suitable epoxy resin is Araldite PY.340-2 of Ceiba Geigy AG.

The thermosetting resin is present in the composition of the invention in the amount of 10 to 20% by weight, preferably 11 to 13% by weight, more preferably about 12% by weight of the inorganic base material.

The presence of the thermosetting resin not only drops the water demand of the inorganic base material but also synergistically binds, reinforces and waterproofs the inorganic base material and accelerates the setting time of the inorganic base material.

The third component of the composition of the invention is a suitable amount of a catalyst for the thermosetting resin. Suitable catalysts for the various types of thermosetting resin have been discussed above. Other suitable catalysts include phosphoric and sulphonic acids, ammonium chloride, sodium bichromate and ammonium bichromate.

The fourth component of the composition of the invention is water in a amount sufficient to rehydrate the inorganic base material with the water present in the other components of the composition. Thus, the water required for rehydration of the inorganic base material is obtained from the added water and from the water contained for example in the thermosetting resin. When the inorganic base material is calcium sulphate hemi-hydrate, water is preferably added in the amount sufficient to provide with the water present in the other components of the composition approximately the amount of water theoretically required for complete rehydration of the calcium sulphate hemi-hydrate.

The fifth component of the composition of the invention is a suitable amount of a melamine formaldehyde condensate. A suitable example of a melamine formaldehyde condensate is Melment F10 of Hoechst. The melamine formaldehyde condensate has the effect of lowering the viscosity of the inorganic base material/water mix, it reduces the water demand of the inorganic base material and it extends the setting time of the inorganic base material. Thus, the balance between the catalyst for the thermosetting resin and the melamine formaldehyde condensate, allows the formulation gel point to be varied to suit the operating procedures.

The melamine formaldehyde condensate is preferably added to the composition in an amount of 0.5 to 2.5% by weight of the inorganic base material, more preferably about 1% by weight of the inorganic base material.

Sodium carboxymethylcellulose in an amount of 0.05 to 0.25% by weight of the inorganic base material may be used in conjunction with the melamine formaldehyde condensate to extend the setting time of the composition.

The sixth component of the composition of the invention is a polyvinyl alcohol. An example of a suitable polyvinyl alcohol is Mowiol of Hoechst, codes 10–74 to 30–92, with the degree of hydrolysis varying from 73.5 to 92.4 respectively and fully saponified grades 4–98 to 66–100 with the degree of hydrolysis varying from 98.4 to 99.7 respectively. The polyvinyl alcohol is added to increase water resistance after drying.

The second aspect of the invention is a method of making a tile body from the composition.

The first step of the method of the invention is to mix together components (a), (b), (d), (e) and (f). These components may be mixed for example in a dough or planetary mixer under vacuum.

In the second step of the method of the invention, component (c), i.e. the catalyst for the thermosetting resin is added and in the third step the tile body is formed. For example, the catalyst may be premixed into the mixture of step (1) of the method of the invention and the mixture may then be treated on a batch basis in which a quantity of the mixture is dispensed automatically or otherwise, by weight, into moulds such as silicone rubber, vacuum formed acrylic, epoxy metal filled polymers or metal moulds, the moulds then being passed over a vibration table to ensure air-free mouldings before setting. Alternatively, the mixture from step (1) may be pumped along a line to an injection head at which point the catalyst may be added and mixed into the mixture, whereafter the mixture is extruded under partial vacuum in a continuous ribbon onto a moving conveyor on which it is cut to length, typically by wire cutters.

In step (4) of the method of the invention rehydration of the inorganic base material occurs and curing of the thermosetting resin occurs. For example, the tile bodies or biscuits may be removed from their moulds or from the conveyor as the case may be, immediately after setting, and stacked in a humidified trolley which is closed to prevent too rapid drying of the tile bodies or biscuits. Rehydration of the inorganic base material now takes place. For example, when the inorganic base material is calcium sulphate hemi-hydrate, rehydration takes approximately 2 to 3 hours, and thereafter, the tile bodies are left desirably for a further two hour period to allow water stabilisation. At this stage, curing of the thermosetting resin also takes place. This may be assisted by passing the tile bodies or biscuits, on a conveyor, under a magnetron or the wave guides of a microwave emitter stationed above and below the conveyor, to raise the temperature of the tile bodies to about 80° C. to fully cure the thermosetting resin.

Thereafter, the tile bodies or biscuits may be suitably treated for example, they may be provided with edge and surface polish by a sander, they may be printed, e.g. screen printed, they may be glazed or coated and then cured.

An example of a composition according to the invention will now be given.

A composition for formation of a tile body comprises the following:

| | |
|---|---|
| Calcium sulphate alpha hemi-hydrate | 400 g |
| Melment F10 (Hoechst) | 4 g |
| Water | 70 g |
| Phenolic resin - British Industrial Plastics Code 17 1390 | 50 g |
| Phosphoric acid catalyst blend - British Industrial Plastics D16 50 | 6 g |
| Mowiol 4-98 to 66-100 (Hoechst) | 5 g |
| Alcopol 0 60% concentrate (Optional) Allied Colloids | 0.5 g |
| Sodium carboxymethylcellulose | 0.5 g |

The composition contains an amount of 70 g of water which gives a calcium sulphate hemi-hydrate to water ratio of 5.714 to 1 as against the theoretical rehydration demand of 5.4 to 1. The balance of water required for rehydration is derived from that contained in the phenolic resin formulation which contains about 16% of water.

The composition contains a catalyst for the phenolic resin in the amount of about 12% by weight.

To summarise the functions of the various components of the example given above, the calcium sulphate hemi-hydrate forms the major component which, when converted from the hemi-hydrate to the di-hydrate, creates a rigid tile body. This process uses the added water plus all the free water in the composition of the invention provided by the other components such as the phenolic resin. This obviates the need for post-drying and means that the composition can be effectively solventless. The thermosetting resin, catalysed by a suitable catalyst, binds the inorganic base material into the tile body. This combination of thermosetting resin and catalyst also serves to accelerate rehydration of the calcium sulphate hemi-hydrate. The setting speed of the composition of the invention is counterbalanced by the use of a melamine formaldehyde condensate which serves to reduce water demand, reduce viscosity and at the same time retard the setting or rehydration of the calcium sulphate hemi-hydrate. Sodium carboxymethylcellulose may also be used to extend the setting time of the composition. The acceleration of the catalyst can therefore be balanced to the deceleration of the melamine formaldehyde condensate. The polyvinyl alcohol reacts with the acid catalyst or the melamine formaldehyde condensate or the aldehyde fractions from the resin to form an insoluble ester, further contributing to water proofness, binding and shock resistance. The result of the composition of the invention, once formed into a tile body, is a product which is entirely suitable for the use as a floor or wall tile.

The tile body has the additional advantages that it does not shrink during manufacture, it does not warp after setting and curing, it has a low water absorption, and is not water sensitive, i.e. does not swell, it is not susceptible to harbouring of micro-organisms, it has adequate strength, both flexile and compressive, and is fireproof.

I claim:

1. A composition for forming a tile body comprises:
 (a) 50% or more by weight of an inorganic base material selected from the group consisting of a calcium sulphate hemi-hydrate, magnesium oxychloride, magnesium oxysulphate and a hydraulic cement;
 (b) a thermosetting resin which is miscible, soluble or dispersable in water, in an amount of 10 to 20% by weight of the inorganic base material;
 (c) a catalyst for the thermosetting resin;
 (d) water in an amount sufficient to rehydrate the inorganic base material with the water present in the other components of the composition;
 (e) a melamine formaldehyde condensate, in an amount of 0.5 to 2.5% by weight of the inorganic base material; and
 (f) a polyvinyl alcohol, in an amount of 0.5 to 2.5% by weight of the inorganic base material.

2. A composition according to claim 1 further comprising:
 (g) sodium carboxymethyl cellulose, in an amount of 0.05 to 0.25% by weight of the inorganic base material.

3. A composition according to claim 1 wherein the inorganic base material is calcium sulphate hemi-hydrate.

4. A composition according to claim 1 wherein the thermosetting resin is 11 to 13% by weight of the inorganic base material.

5. A composition according to claim 1 wherein the thermosetting resin is a phenolic resin.

6. A composition according to claim 1 which contains about 1%, by weight of the inorganic base material, of a melamine formaldehyde condensate.

7. A composition according to claim 1 which contains about 1%, by weight of the inorganic base material, of a polyvinyl alcohol.

8. A composition for forming a tile body comprises:
 (a) 50% or more by weight of calcium sulphate hemi-hydrate;
 (b) a phenolic resin, in an amount of 11 to 13% by weight of the inorganic base material;
 (c) a catalyst for the phenolic resin;

(d) water in an amount sufficient to provide with the water present in the other components of the composition approximately the amount of water theoretically required for complete rehydration of the calcium sulphate hemi-hydrate;

(e) a melamine formaldehyde condensate, in an amount of 0.5 to 2.5% by weight of the inorganic base material; and (f) a polyvinyl alcohol, in an amount of 0.5 to 0.25% by weight of the inorganic base material.

9. A composition according to claim 8 further comprising:

(g) sodium carboxymethyl cellulose, in an amount of 0.05 to 0.25% by weight of the inorganic base material.

10. A method of making a tile body from a composition comprising:

(a) 50% or more by weight of an inorganic base material selected from the group consisting of a calcium sulphate hemi-hydrate, magnesium oxychloride, magnesium oxysulphate and a hydraulic cement;

(b) 10 to 20%, by weight of the inorganic base material, of a thermosetting resin which is miscible, soluble or dispersable in water;

(c) a catalyst for the thermosetting resin;

(d) water in an amount sufficient to rehydrate the inorganic base material with the water present in the other components of the composition;

(e) 0.5 to 2.5%, by weight of the inorganic base material, of a melamine formaldehyde condensate; and (f) 0.5 to 2.5%, by weight of the inorganic base material, of a polyvinyl alcohol;

wherein said method comprises the steps of:

(1) mixing together components (a), (b), (d), (e) and (f);

(2) adding component (c) to the mixture of step (1);

(3) forming the composition of step (2) into a tile body; and (4) allowing rehydration of the inorganic base material to occur and curing of the thermosetting resin to occur.

11. A method according to claim 10 wherein after step (4) the tile body is decorated by printing, glazing and/or coating.

12. A method according to claim 10 or claim 11 wherein in step (3) the composition of step (2) is formed into a tile body by moulding or extrusion.

13. A method of making a tile body from a composition comprising:

(a) 50% or more by weight of calcium sulphate hemi-hydrate;

(b) 11 to 13%, by weight of component (a), of a phenolic resin;

(c) a catalyst for the phenolic resin;

(d) water in an amount sufficient to provide with the water present in the other components of the composition approximately the amount of water theoretically required for complete rehydration of the calcium sulphate hemi-hydrate;

(e) 0.5 to 2.5%, by weight of component (a), of a melamine formaldehyde condensate; and (f) 0.5 to 2.5, by weight of component (a), of a polyvinyl alcohol; wherein said method comprises the steps of:

(i) mixing together components (a), (b), (d), (e) and (f);

(ii) adding component (c) to the mixture of step (i);

(iii) forming the composition of step (ii) into the tile body; and (iv) allowing rehydration of the inorganic base material to occur and curing of the thermosetting to occur.

14. The method according to claim 13 wherein after step (iv) the tile body is decorated by printing, glazing and/or coating.

15. The method according to claim 13 or claim 14 wherein in step (iii) the composition of step (ii) is formed into a tile body by moulding or extrusion.

* * * * *